Feb. 4, 1947.        W. H. J. BROCK              2,415,232
                      SECURING DEVICE
                    Filed Dec. 13, 1943
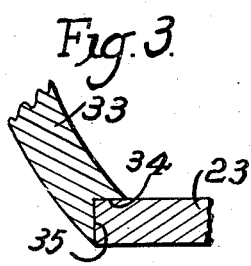
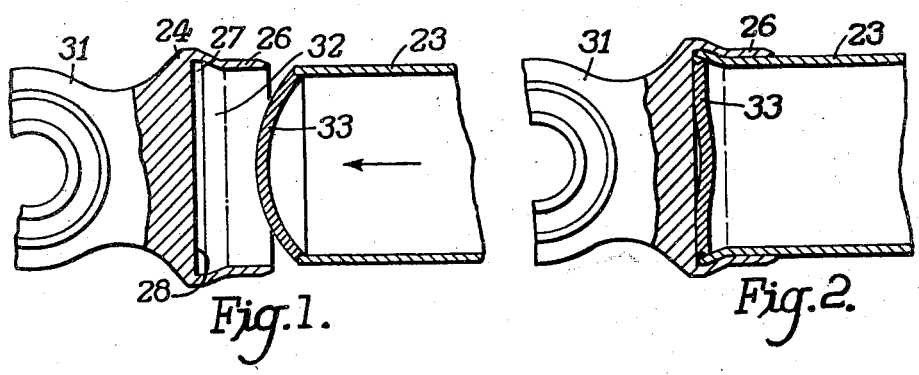
Inventor
William Hudson James Brock
by Stevens and Davis
his attorneys Patented Feb. 4, 1947

2,415,232

UNITED STATES PATENT OFFICE 2,415,232

SECURING DEVICE

William Hudson James Brock, Leamington Spa, England, assignor of one-half to Automotive Products Company Limited, Leamington Spa, England Application December 13, 1943, Serial No. 514,174
In Great Britain December 21, 1942

1 Claim. (Cl. 287—20)

This invention relates to securing devices for use with tubes and it has for its object to provide improved means for attaching to a tubular member a collar, piston, plug or like external or internal fixture.

According to the invention, in a member which initially engages said tube telescopically, an endless groove is formed around that surface of the member engaging the tube, and a dished washer or disc is placed in register with the groove but against that surface of the tube wall remote from the groove, said washer or disc then being flattened and caused to spread, whereby it deforms the material of the tube into locking engagement with the groove. The term "dished" washer or disc is intended to include any washer or disc which is non-planar and, being endless, is thereby caused to spread radially by the mere action of being flattened to a substantially plane condition. Thus, in addition to the frusto-conical form, which is that generally preferred in the case of washers, the invention may be carried into effect by using a washer which is of arcuate radial section or which in that section is of splayed V-shape or is corrugated. Where the washer is required to extend outwards upon flattening it may instead or in addition be corrugated in a circumferential sense.

The invention provides means for securing a cap to the end of a tube consisting in forming a circumferential groove in the wall of the cap immediately adjacent the diametral wall thereof, and splaying the end of the tube into said groove by a dished washer or disc which latter is inserted into the tube in its dished condition, and is then flattened against the cap so as to expand radially for splaying the tube, the washer or disc being left in position for supporting the splayed end of the tube.

The invention is illustrated by way of example in the accompanying diagrammatic drawing, in which:

Figures 1, 2 and 3 are sectional elevations showing the improved means for securing a cap to a tube.

Referring to the drawing, 23 indicates a tube which is to be fitted with a cap 24 formed with a lug 31. Adjacent the bottom surface 28 of the cap the curved wall 26 is circumferentially grooved, as indicated at 27, and wall 32 of the groove opposite to the surface 28 of the cap is gently sloped. For the purpose of spreading the end of the tube 23 a dished disc 33, conveniently of part-spherical shape, is provided and is slightly larger in diameter than the bore of the tube 23. This enables the periphery of the disc to be formed with a V-shaped groove, producing a cylindrical spigot portion 34, and a radial shoulder 35, as will be seen more clearly in Figure 3, which represents to an enlarged scale the initial inter-engagement of the disc 33 with the end of the tube 23. It will now be seen that when the tube 23 is forced axially into the cap 26 the middle part of the washer 33 butts against the surface 28 of the cap and as the movement of the tube 23 continues the engagement of said tube with the shoulder 35 causes the washer to be progressively flattened; at the same time its outside diameter increases and the spigot portion 34 of the washer forces the end part of the tube 23 into the groove 27. It is, of course, necessary that the wall 32 of the groove should be sloping in order that this action may take place. When the tube 23 finally butts against the surface 28 of the cap the end of the tube is in full engagement with the groove 27 and the washer 33 is found to assume a relatively flat condition, somewhat as shown in Figure 2. The washer in this condition firmly holds the tube in the groove 27, this action being assisted by the fact that the relatively sharp edge of the disc at the end of the spigot portion 34 then tends to bite into the metal of the tube 23.

It will be understood that the arrangements which have been described are given merely by way of example and that numerous other modifications are possible. The tubes are not necessarily made of metal but can be composed of other materials such as synthetic resin or other plastic. Moreover, the invention is not limited to tubes of circular cross-section.

What I claim is:

A tube and end cap adapted for mutual connection, said end cap comprising an end wall and a cylindrical tube-surrounding portion extending therefrom, the internal surface of said end wall being flat and the tube-surrounding portion of said end cap defining an internal annular groove adjacent said end wall, said tube being cylindrical and having an end lying in a single plane normal to the long axis of the tube, and a convex disc having a peripheral groove in its outer edge dividing said edge into two portions, said disc being fitted over said end of the tube with one of its peripheral edge portions engaging the edge of the tube and the other of its peripheral edge portions engaging the inner cylindrical wall of said tube whereby the tube and cap may be secured to one another by inserting the tube into the cap and pressing the two toward one another to cause the disc to flatten against the flat internal end wall surface of said cap and, in so doing, to expand radially and force the end edge of the tube into the annular groove in the cap.

WILLIAM HUDSON JAMES BROCK.

REFERENCES CITED

The following references are of record in the file of this patent:

UNITED STATES PATENTS

| Number | Name | Date |
| --- | --- | --- |
| 1,055,925 | Lathrop | Mar. 11, 1913 |
| 586,438 | Inshaw | July 13, 1897 |
| 1,330,913 | Short | Feb. 17, 1920 |
| 1,704,228 | Tibbetts | Mar. 5, 1929 |

FOREIGN PATENTS

| Number | Country | Date |
| --- | --- | --- |
| 26,562 | British | Nov. 24, 1896 |